UNITED STATES PATENT OFFICE.

ALONZO HITCHCOCK, OF NEW YORK, N. Y.

IMPROVEMENT IN GRAPHITIZED MATERIALS FOR JOURNALS, BEARINGS, AND OTHER PURPOSES.

Specification forming part of Letters Patent No. 133,101, dated November 19, 1872.

*To all whom it may concern:*

Be it known that I, ALONZO HITCHCOCK, of the city, county, and State of New York, have invented a new Process for Combining and Uniting Graphite or Plumbago with any Vegetable Substance, thereby constituting a new article of manufacture, of which the following is a specification:

The nature of my invention is to incorporate graphite, metals, or earths, with parchment during the transformation of vegetable fiber or vegetable substance into parchment, or analogous substance.

Take any vegetable fibrous material, as cotton, hemp, paper, or cloth, and treat them with sulphuric acid, cloride of zinc, or any other reagent or reagents, as in the ordinary methods of making what is known as vegetable parchment, or substance allied thereto; or they are treated by any approved plan which will produce the required result, namely, the converting of the paper, or cloth, or other vegetable material, or the surface of the same, into a gelatinous state similar to the mode of making vegetable parchment—that is to say, the vegetable substance is treated or immersed in a dilute sulphuric-acid bath, in about the proportions of two parts of sulphuric acid to one of water. For example, I treat paper in this sulphuric-acid bath for a few moments, until the whole mass, or at least until the surface of it, is transformed into a gelatinous state. It is then immediately removed from this bath, and before washing, and while in this gelatinous state, I cover one or both surfaces with finely-pulverized graphite, and immediately put it into a bath to neutralize the acid. This bath may consist of simple water, or any aqueous solution of ammonia gas, or other alkaline liquids, such as the carbonates of the alkaline metals, or their hydrates. When paper or vegetable material has been thus treated and dried it will be found that the gelatine of the vegetable fiber or substance and the graphite have formed a perfect cohesion or union, producing a fine graphitized surface, thereby making a new article of manufacture. All vegetable textile fabrics, as cotton and hemp, may be treated by the same process, and with like results. Cotton, hemp, Manila, or like material, may be thus treated in the raw state before being manufactured into yarns or cloth. Yarns may be treated before woven into cloth or spun into ropes. Cotton or flax sewing-thread may be treated in the same way. The surface of some kinds of wood and bark can be successfully treated by this process. All kinds of vegetable paper pulp may be so treated. I also mix other acids or reagents with sulphuric acid, when the same gelatinous state of the material will be produced, as, for instance, in the manufacture of gun-cotton, when certain proportions of sulphuric acid and nitric acid are used the result will be the same; and in treating raw cotton I find such mixture of acids an advantage, as the transformation is not carried on so rapidly and gives more time to incorporate the graphite—otherwise, without great care, the sulphuric acid alone will destroy the fine cotton fibers before the acid can be neutralized. I also treat esculent roots, as potatoes and carrots, or such vegetable substance as is used to make artificial ivory—that is, to treat those vegetables in dilute sulphuric acid in about the same proportions used for making such artificial ivory, and when the vegetable substance is removed from the bath it is covered with graphite and put into a neutralizing bath, after which the material may be dried and pressed in the usual way for making artificial ivory; the graphite may be added before removing from the bath. I am now experimenting with asbestus alone, and in combination with other material, as cotton and hemp, to produce substantially the same results herein named; but this will be the subject of a future patent.

I am aware that other materials, as metals, or earths, can be used for coating surfaces as herein described, but they must be such materials as are not injuriously acted upon by the acids, and will readily unite with the gelatinized surface or substance, such as gold, silver, platium, glass, or emery, granulated or reduced to fine powder.

This graphite parchment and other graphitized materials are susceptible of many and various uses. Prominent among others is its application as an anti-friction in journal-boxes, and packing for various parts of the steam-engines, gaskets for steam or water-joints;

many of which applications may be subjects of future patents.

I designate this new material as graphite parchment, graphitized cloth, graphitized packing, &c.

I claim—

1. Any suitable vegetable material incorporated or covered with graphite by means substantially as set forth in the foregoing specification.

2. The process herein described for combining graphite or suitable materials with vegetable fiber or matter, the same consisting in treating with acids or chemicals so as to form a gelatinous substance and applying the graphite or other material thereunto, substantially as set forth.

ALONZO HITCHCOCK.

Witnesses:
   A. V. LEARING,
   R. HITCHCOCK.